March 9, 1954　　　R. L. BURLA　　　2,671,378
AUTOMATIC SLIDE PROJECTOR
Filed June 16, 1950　　　　　4 Sheets-Sheet 1
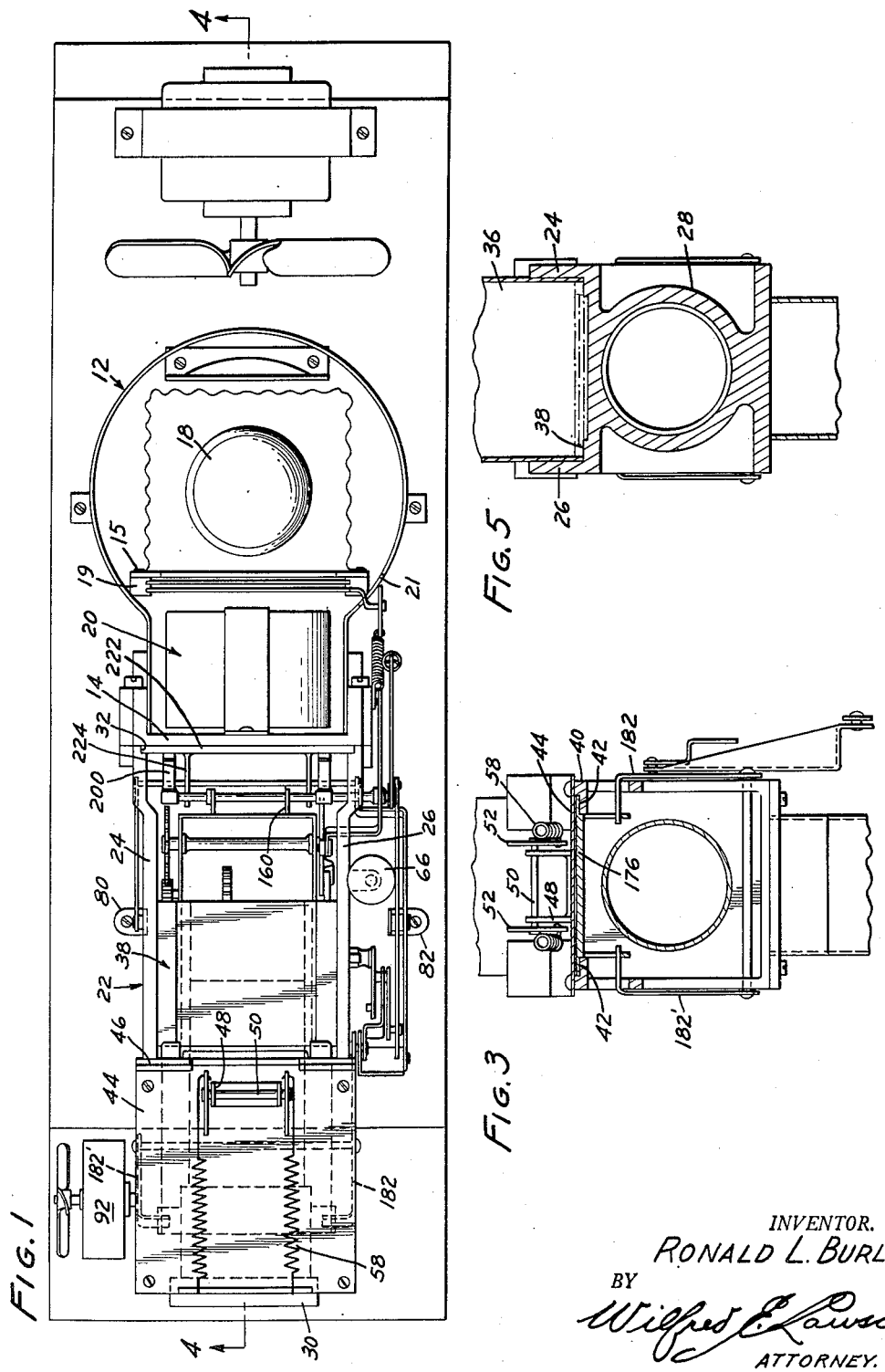
INVENTOR.
RONALD L. BURLA,
BY
Wilfred E. Lawson
ATTORNEY.

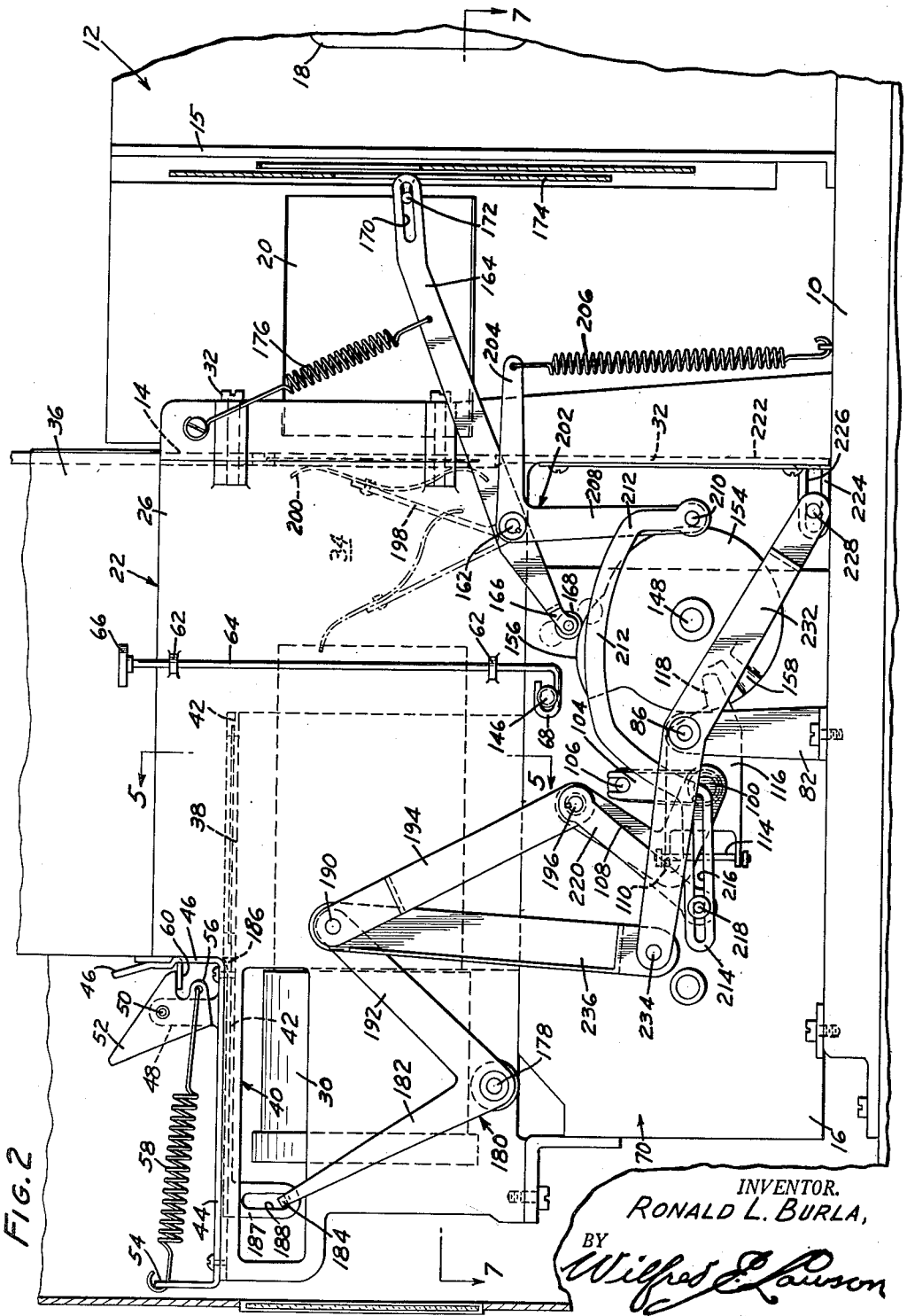

March 9, 1954  R. L. BURLA  2,671,378
AUTOMATIC SLIDE PROJECTOR
Filed June 16, 1950  4 Sheets-Sheet 3
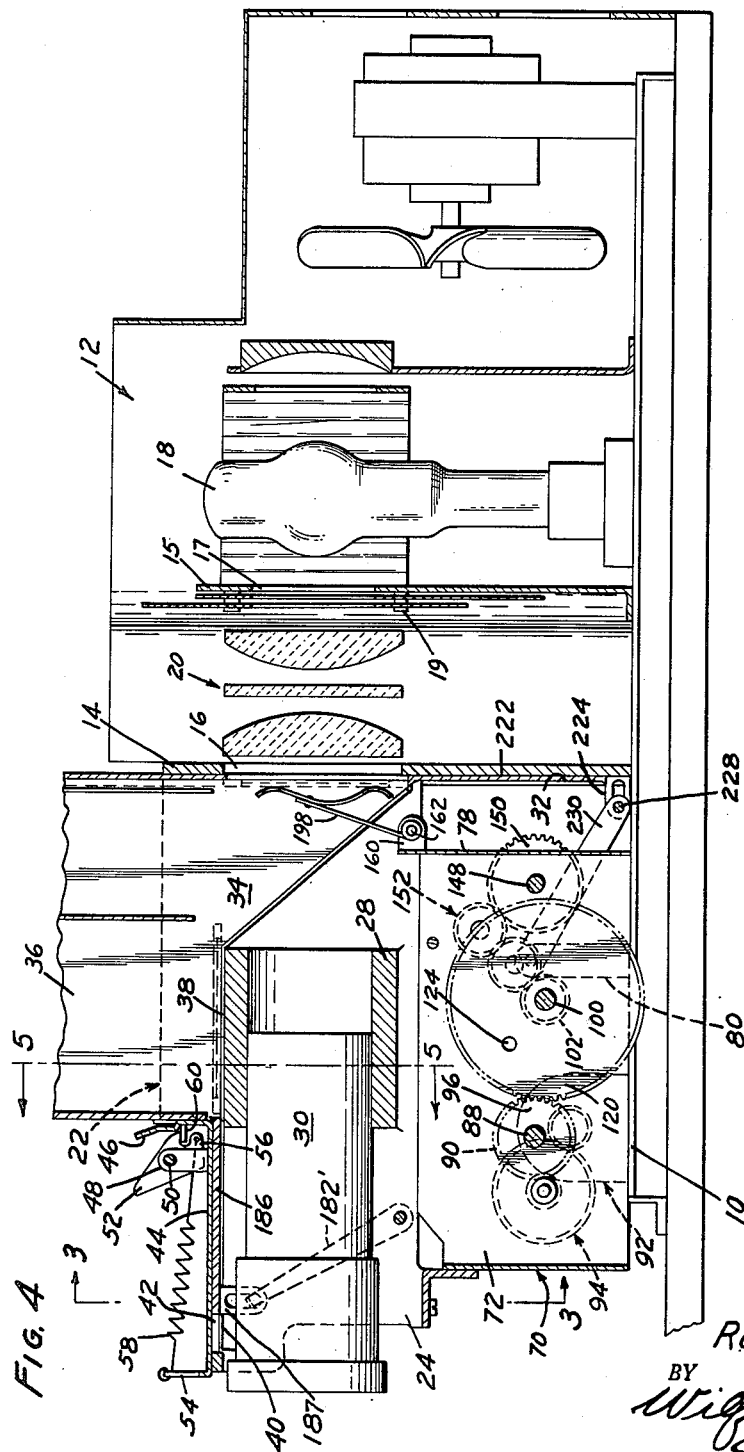
INVENTOR.
RONALD L. BURLA,
BY
Wilfred E. Lawson
ATTORNEY.

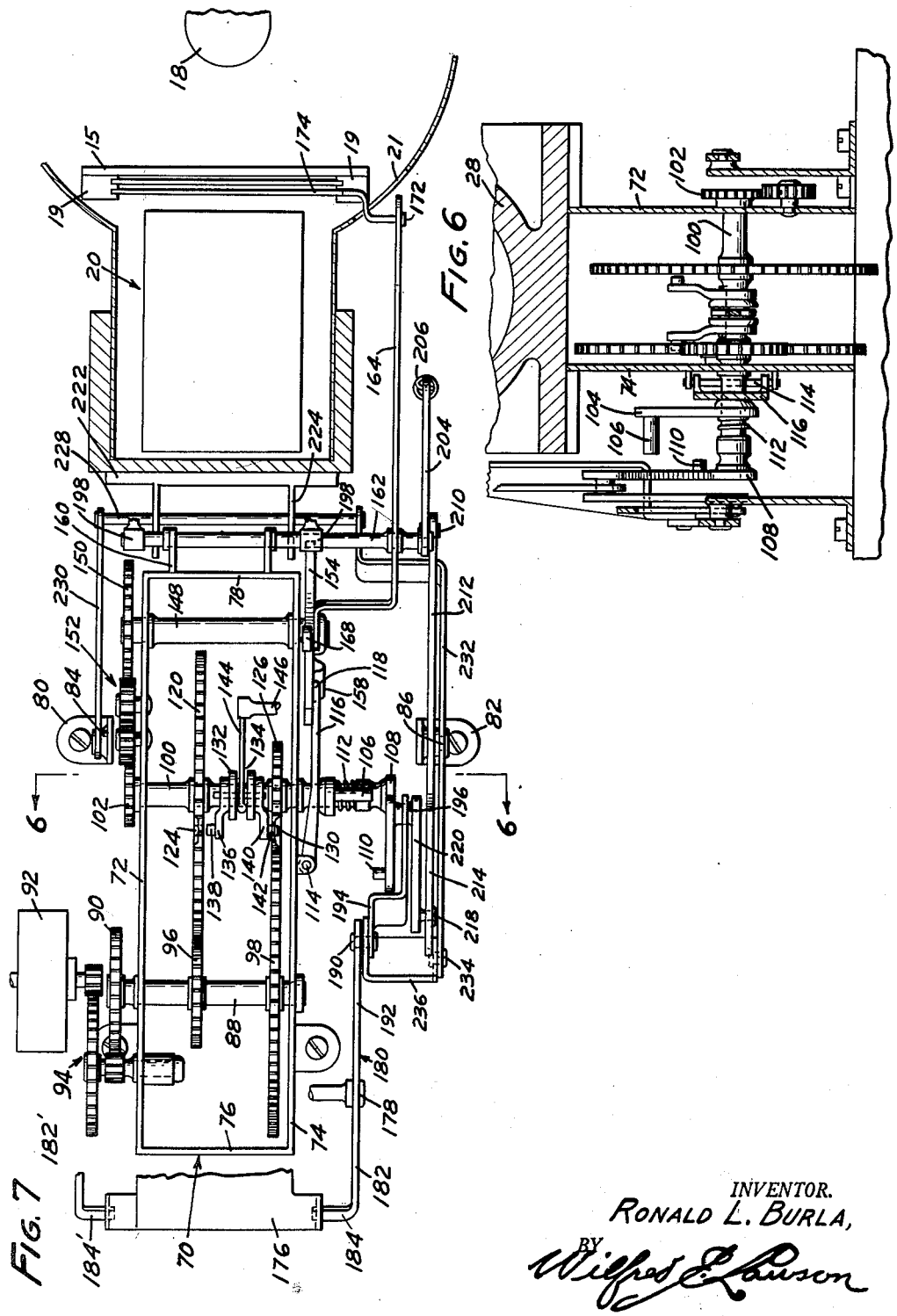

Patented Mar. 9, 1954

2,671,378

UNITED STATES PATENT OFFICE 2,671,378

AUTOMATIC SLIDE PROJECTOR

Ronald L. Burla, Beverly Hills, Calif., assignor to The Cadwell Corporation, Beverly Hills, Calif., a corporation of California Application June 16, 1950, Serial No. 168,469

4 Claims. (Cl. 88—28)

This invention relates to slide exhibiting apparatus and more particularly to means automatically to change the slides in a slide exhibitor without requiring the presence of an attendant.

Heretofore the projection of a series of slides has required an operator whose duty it was to close the shutter of the projector and while maintaining the shutter closed to manually extract from the projector the exhibited slide, and to substitute therefor a slide to be exhibited and then subsequently to open the shutter. The slide changing therefor has required several manual operations to be performed in proper sequence and hence the successful operation of the exhibitor or projector required the services of a skilled operator.

The primary object of this invention is to avoid the necessity of employing the services of a skilled operator of the projector apparatus during the presentation of an illustrated lecture or during the exhibition of slides.

Another object is to automatically change the slides in a projector or exhibiting apparatus.

A further object is to enable the slides to be exhibited in rapid or relatively slow sequence so that the changing thereof may be regulated to suit the rapidity with which a viewer may desire.

Still another object is to effect the changing of the slides in an orderly manner and without interruption and further to avoid the necessity of an attendant.

The above and other objects may be attained by employing this invention which embodies among its features, a slide gate mounted to rock toward and away from an aperture through which light is projected, an injector for moving a slide from the bottom of a stack of slides and advancing it toward the slide gate and means connected to the injector and the slide gate for advancing the slide onto the slide gate while the latter is away from the aperture.

Other features include an ejector operating across the aperture for displacing an exhibited slide and clearing the aperture for the presentation of another slide thereto and means connected to the ejector and to the slide gate and injector operating means for operating the ejector in timed relation to the movements of the slide gate and injector.

Still other features include a shutter for intercepting light projected through the aperture and means operating in timed relation to the operation of the slide gate and the injector and ejector for moving the shutter into opening and closing relation to the aperture.

A further feature includes a prime mover connected to the slide gate, injector and ejector operating apparatus for operating the slide gate, injector and ejector, and means between the prime mover and said operating apparatus for changing the speed at which the various operations take place.

Still further features include timing means operatively connected to the prime mover for continuous operation during the operation of the projector for regulating the sequence in which the shutter and the slide gate, ejector and injector move.

In the drawings:

Figure 1 is a top plan view of a slide projector embodying the features of this invention, the case being omitted, Figure 2 is a side view of the projector illustrated in Figure 1, showing the position taken by the various cranks and levers during the changing of a slide, Figure 3 is a front end view of the projector illustrated in Figure 4, Figure 4 is a longitudinal sectional view taken substantially along the line 4—4 of Figure 1, Figure 5 is a transverse sectional view taken substantially on the line 5—5 of Figure 4, Figure 6 is a transverse sectional view taken substantially on the line 6—6 of Figure 7, Figure 7 is a horizontal sectional view taken substantially along the line 7—7 of Figure 2.

Referring to the drawings in detail a base on bed 10 has secured thereto a lamp house designated generally 12, the front wall 14 of which is provided with an aperture 16 through which light is projected from a source of illumination 18 by a system of condensing lenses 20.

Interposed within the lamp house 12 between the source of illumination 18 and the lens system 20 is a partition wall 15 having an aperture 17 therein which aligns with the lens system 20 and carried by the wall 15 on the side thereof remote from the source of illumination 18 is a pair of spaced vertical guide members 19 in which is mounted a shutter to be more fully hereinafter described. An elongated vertical slot 21 is formed in the lamp house 12, the purpose of which will hereinafter appear.

Carried by the wall 14 on the side thereof remote from the lens system 20 is a projector housing designated generally 22 comprising spaced parallel side walls 24 and 26 and carried by and extending between said side walls adjacent the ends thereof remote from the wall 14 is a housing 28 containing a focusing lens system 30 which aligns axially with the aperture 16 above mentioned. Formed at the junction of each wall 24 and 26 with the wall 14 is a vertically extending guide groove 32, the purpose of which will hereinafter appear, and formed between the wall 14 and the housing 28 is a slide receiving chamber 34.

The tops of the walls 24 and 26 are extended upwardly above the top of the focusing lens housing 28 to form guides for the lower end of a magazine 36 containing the slides to be exhibited and the top of the lens housing 28 is substantially flat to form a table 38 upon which rests the lowermost slide in the magazine 36. Carried by the walls 24 and 26 and projecting therefrom in a direction opposite the lamp house 12 is a pair of spaced parallel arms 40 and formed on the inner faces of the arms and extending into the walls 24 and 26 substantially at the level with the table 38 are opposed grooves 42 in which slides the injector, to be more fully hereinafter described. A cover plate 44 is carried by the arms 40 and overlies the injector when the latter is in retracted position, and carried by the cover plate at the end thereof adjacent the table 38 is a pair of spaced upstanding tongues 46 forming guides for guiding the lower end of the magazine 36 into position above the table 38.

Carried by the cover plate 44 adjacent the end thereof carrying the tongues 46 is a U-shaped bracket 48 carrying a pivot shaft 50 upon which latches 52 are mounted to rock, and carried by the cover plate 44 at the end thereof remote from the tongue 46 are upstanding ears 54. Each latch 52 is provided with an arm 56 which moves in an arc above and below the axis of the pivot pins 50 on the side thereof adjacent the tongues 46 and connected to each arm is one end of a retractile coiled spring 58, the opposite end of which is connected to an ear 54 so that as an arm 56 approaches dead center the spring 58 coupled thereto will be extended. In this way each latch 52 is yieldingly held in open or closed position. Carried by the magazine 36 adjacent the lower end thereof is an outstanding keeper 60 which as the magazine 36 is placed in position above the table 38 engages the arms 56 and rocks the latches 52 on the shaft 50 against the effort of the springs 58 until the arms 56 pass dead center at which time the springs exert pull on the arms 56 to cause the latches 52 to exert downward pull on the keeper 60. Obviously reverse movement of the magazine 36 will increase the tension of the springs 58 until the arms 56 pass dead center at which time the springs 58 will snap the latches to open position. In this way rapid interchange of magazines may be had.

Carried by the wall 26 and projecting outwardly therefrom is a pair of vertically spaced ears 62 which are provided with aligned openings in which a manually actuated speed control shaft 64 is mounted to rotate. This shaft extends upwardly beyond the upper edge of the side wall 26 and carries at its upper end a thumb wheel 66 by which the shaft 64 may be turned about its axis. The lower end of the shaft 64 projects below the bottom edge of wall 26 and is bent to provide a laterally projecting hook member 68 the purpose of which will hereinafter appear.

Fixed to the bed 10 below the side walls 24 and 26 is a frame designated generally 70 comprising side plates 72 and 74 held in spaced parallel relation by end plates 76 and 78, and mounted on the bed 10 in outwardly spaced relation to the side plate 72 is an upstanding pedestal 80. A similar upstanding pedestal 82 is fixed to the base 10 outwardly from the side plate 74. These pedestals carry adjacent their upper ends outwardly extending axially aligning pivot pins 84 and 86 respectively, the purpose of which will hereinafter appear.

Mounted in the frame 70 for rotation about a horizontal axis is a drive shaft 88 which projects through the plate 72 and carries adjacent its outer end a drive wheel 90 which has driving connection with a prime mover 92 as by a gear train 94. Fixed to the drive shaft 88 intermediate its ends is drive pinion 96 and a drive gear 98 is fixed to the shaft 88 within the frame 70 adjacent the plate 74 thereof.

A driven shaft 100 is mounted in the side plates to rotate about an axis which lies parallel to the axis about which rotates the drive shaft 88. This driven shaft 100 projects beyond the side plate 72 and has fixed thereto for rotation therewith a timing gear 102. The opposite end of the driven shaft 100 projects through the plate 74 and has mounted thereon for rotation therewith and longitudinal sliding movement thereon an arm 104 carrying a laterally extending clutch pin 106. A crank arm 108 is mounted for rotation on the shaft 100 adjacent the extreme outer end thereof and carries an inwardly projecting clutch pin 110 which revolves in an arcuate path concentric about the shaft 100 and corresponds to the path in which the clutch pin 106 revolves. A compression coil spring 112 encircles the shaft 100 between the arm 104 and the crank arm 108 to normally hold the clutch pin 106 out of engagement with the clutch pin 110 and thus permit the shaft 100 to turn without imparting turning movement to the crank arm 108. Pivotally supported on the outer side of the side plate 74 as at 114 for movement about a vertical axis which lies between the shafts 88 and 100 is a trip lever 116 which engages the arm 104 adjacent the shaft 100 on the side thereof remote from the spring 112 so that when the trip arm is moved outwardly away from the plate 74 the arm 104 will be moved against the effort of the spring 112 and cause the clutch pin 106 to engage the clutch pin 110 so as to cause the crank arm 108 to rotate in unison with the shaft 100. A trip finger 118 is carried by the trip lever 116 at the end thereof remote from the pivot 114 and is engaged by the trip cam 158 carried by the timing mechanism yet to be described.

Mounted on the shaft 100 within the frame 70 is a drive gear 120 which meshes with a drive pinion 96 which is fixed to the drive shaft 88. The drive gear 120 is provided between its axis and its periphery with an opening 124 the purpose of which will hereinafter appear. A drive pinion 126 is mounted on the shaft 100 in spaced relation to the drive gear 120 and like the drive gear 120 is rotatable relative to the shaft 100. This drive pinion 126 meshes with a drive gear 98 which is fixed to the drive shaft 88 and like the drive gear 120 is provided intermediate its axis and its periphery with an opening 130. Splined or otherwise mounted on the shaft 100 for longitudinal sliding movement thereon but rotation therewith is a clutch collar 132 having an annular groove 134 intermediate its ends. This collar 132 is located between the gear 120 and the pinion 126 and carried at the end of the collar 132 adjacent the gear 120 is a radial arm 136 carrying an outstanding pin 138 which moves in a path concentric about the shaft 100 and which registers with the path in which the opening 124 revolves. A similar radial arm 140 is carried by the collar 132 at the end thereof adjacent the pinion 126 and like the arm 136 carries a laterally extending pin 142 which revolves in a concentric path which registers with the path of movement of the opening 130. It will thus be seen that by shifting the collar 132 longitudinally on the shaft 100 toward the gear 126, the pin 138 may be entered into the opening 124 so as to cause the shaft to rotate in unison with the gear 120 at relatively low speed and that by shifting the collar 132 in the opposite direction toward the pinion 126, the pin 140 may be entered into the opening 130 so as to cause the shaft to rotate in unison with the pinion 126 at relatively high speed.

Entering the groove 134 in the collar 132 are the tines of a fork 144 which is carried on the end of a shift rod 146 which is mounted in the wall 74 to slide transversely of the frame 70. This shift rod carries at the end thereof remote from the fork 144 an annularly grooved head 146 in the groove of which are received opposite legs of the hook 68. It will thus be seen that by rotating the thumb wheel 66 the shift rod 146 and fork 144 will be moved transversely of the frame 70 to shift the collar 132 and enter one or the other of the pins 138 or 142 in their respective openings 124 or 130 and thereby decrease or increase the speed at which the shaft 100 is driven.

Mounted in the frame 70 for rotation about an axis which lies parallel with the axes of the shafts 88 and 100 is a timing shaft 148 which projects through the plate 72 and carries adjacent its end a drive gear 150 which has driving connection with the timing gear 102 through the medium of a gear train 152. A cam wheel 154 is carried by the shaft 148 on the outside of the frame 70 adjacent the plate 74 and this cam wheel is provided on its periphery with an outstanding cam 156 the purpose of which will hereinafter appear. A trip cam 158 projects laterally from the cam wheel and moves in a rotary path which intersects the trip finger 118 so that when the cam wheel 154 rotates the trip lever 116 will be moved against the effort of the spring 112 to cause the pin 106 to engage the pin 110 and move the crank arm 108 in unison with the shaft 100.

Mounted in suitable brackets 160 carried by the wall 79 which project rearwardly therefrom on opposite sides of the side walls 24 and 26 is a transversely extending rock shaft 162 which projects beyond the outside of the wall 26 and mounted for rocking movement on the rock shaft 162 is a shutter actuating lever 164. One end of the shutter actuating lever 164 is bifurcated as at 166 and mounted for rotation in said bifurcated end 166 of the lever 164 is a roller 168 which rides on the periphery of the cam wheel 154 so that as the latter revolves, the lever 164 will be moved about the axis of the shaft 162 by the cam 156. The opposite end of the lever 164 projects through the slot 21 in the lamp house and is slotted as at 170 to receive a stud 172 carried by a shutter 174 which is mounted for vertical sliding movement in the guide members 19 carried by the partition wall 15 for opening and closing the aperture 17 therein. A retractile coiled spring 176 is connected at one end to the lever 164 intermediate the rock shaft 162 and the slot 170 and the opposite end of said spring is connected to the wall 14 above the lever 164 so as to exert upward pull on the slotted end of the lever 164 and hold the roller 168 in contact with the periphery of the cam wheel 154. It will thus be seen that as the cam wheel 154 revolves with the shaft 148, the shutter 174 will be reciprocated in the guide members 19 to open and close the aperture 17 in the wall 15 thus alternately interrupting the light rays emanating from the light source 18 which pass through the aperture 17.

Mounted for rocking movement on a laterally extending stud 178 carried by the wall 26 below the cover plate 44 is a V-shaped rock arm designated generally 180 one leg 182 of which extends forwardly and upwardly and carries an inwardly extending finger 184. An injector plate 186 is mounted in the guide grooves 42 in the arms 40 and this injector plate carries on the side thereof adjacent the wall 26 and adjacent the end thereof remote from the wall 14 a downwardly extending ear 187 which is provided with an elongated vertical slot 188 in which the finger 184 is received. It will thus be seen that as the rock arm 180 is moved about its pivot 178, the injector plate will be moved across the table 38. When the injector plate 186 moves to the right when viewed as in Figure 2, it will be evident that the bottommost slide in the magazine 36 will be moved rearwardly off the table 38 and into the chamber 34. Pivotally connected as at 190 to the arm 192 of the rock arm 180 is one end of a link 194 the opposite end of which is connected as at 196 to the crank arm 108 at the end thereof remote from the shaft 100. It will thus be seen that as the crank arm 108 rotates with the shaft 100 the rock arm 180 will be rocked to cause the injector 186 to reciprocate in its guide grooves 42.

In order to catch slides delivered into the chamber 34 from the table 38 and place them in proper position for projection over the aperture 16 in the wall 14 the rock shaft 162 is provided with slide gate comprising a pair of spaced parallel arms 198 which carry spaced parallel leaf springs 200 which form cushions upon which the slides are caught in the chamber 34 and by which a slide is yieldingly held against the wall 14 in covering relation to the aperture 16 therein. A bell crank lever designated generally 202 is fixed to the rock shaft 162 adjacent the outer end thereof and one arm 204 of said bell crank lever extends substantially horizontally toward the lamp house 12 and has connected thereto one end of a retractile coiled spring 206, the opposite end of which is anchored to the base or bed 10. This spring 206 yieldingly urges the leaf springs 200 of the slide gate into yielding contact with the wall 14 adjacent the aperture 16 therein. The opposite leg 208 of the bell crank lever 202 extends downwardly and pivotally connected to the lower end thereof as at 210 is an arch shaped link 212 which extends upwardly and forwardly from the arm 208 to clear the shaft 148. The end of the link 212 opposite its pivoted connection with the arm 208 is provided with an elongated substantially horizontal extension 214 having an elongated longitudinal slot 216 therein. A stud 218 projects through the slot 216 and is fixed in a link 220 adjacent one end thereof. This link 220 is rigidly connected at 196 to the crank arm 108 so as to cause the link 212 to reciprocate through a limited distance and cause the arm 202 to rock the shaft 162 and open the slide gate formed by the springs 200.

In order to eject a slide from its position before the aperture 16 in the wall 14 an ejector plate 222 is mounted to slide vertically adjacent the wall 14 in the guides 32 and carried by the ejector plate 222 adjacent the lower corners thereof are forwardly extending ears 224 each of which is provided with an elongated longitudinally extending slot 226. Extending through the slots 226 in the ears 224 is a cross bar 228 and riveted or otherwise secured to the cross bar 228 at the end thereof adjacent the side plate 72 is one end of an arm 230, the opposite end of which is pivotally mounted on the stud 84 carried by the pedestal 80. An ejector actuating lever 232 is riveted or otherwise rigidly secured to the end of the cross bar 228 remote from the arm 230 and this lever is pivotally mounted intermediate its ends on the stud 86 carried by the pedestal 82. The end of the lever 232 remote from the cross bar 228 is pivotally connected at 234 to the lower end of a link 236, the upper end of which is connected to the pivot 190 at the junction of the arm 192 and the link 194. It will thus be evident that as the pivot 190 moves downwardly under the influence of the link 194, the link 236 will likewise move downwardly to rock the lever 232 about its pivot 86 and thus cause the ejector 222 to move upwardly in its guide ways 32.

In operation a magazine 36 containing the slides to be exhibited is placed on the exhibitor by placing its lower end carrying the keeper 60 in place adjacent the tongue 46 so that it engages the arms 56 and moves the latches 52 against the effort of the springs 58 to cause them to engage the keeper 60 and yieldingly hold the magazine in place. With the magazine in such a position the bottommost slide in the magazine will rest on the table 38 and the device is ready for operation. The prime mover 92 is then energized, thus causing the drive shaft 88 to rotate the drive pinion 96 and the drive gear 98 and cause the gear 120 and 126 to rotate at different speeds. Upon turning the thumb wheel 66 in a clockwise direction the clutch collar 32 will be shifted longitudinally on the shaft 100 to cause the pin 138 to enter the opening 124 in the gear 120 and cause the shaft 100 to rotate at slow speed in unison with the gear 120. Turning the thumb wheel 66 in a counterclockwise direction will cause the pin 138 to be withdrawn from the opening 124 and further movement of the thumb wheel 66 in a counterclockwise direction will cause the pin 142 to enter the opening 130 in the pinion 126 and cause the shaft 100 to rotate at a relatively higher speed. Rotation of the shaft 100 causes the timing shaft 148 to rotate through the medium of the gear train 152 and causes the cam wheel 154 to revolve. As the cam wheel 154 revolves, the roller 168 riding on the periphery thereof is engaged by the cam 156 to cause the lever 164 to rock about the shaft 162 and move the shutter 174 in its guide ways to open and close the opening 17 in the partition wall 14. It is to be noted that the cam 156 is of such a shape that the shutter 174 is gradually moved to open position and so held for a period of time sufficient to give adequate visibility to the slide being projected and that at the expiration of such period, the shutter rapidly moves to closed position. As the cam wheel 154 rotates and immediately after the shutter 174 moves to closed position, the trip cam 158 carried by the cam wheel 154 engages the finger 118 on the trip lever 116 and moves the trip lever 116 about its pivot 114 against the effort of the spring 112 so as to shift the arm 104 and the pin 106 outwardly. Such outward movement of the pin 106 causes it to engage the pin 110 on the crank arm 108 so as to cause said crank arm 108 to rotate in unison with the shaft 100. The revolution of the crank arm 108 about the axis of the shaft 100 actuates both the slide injector and the ejector mechanism as follows: As the end of the crank arm 108 moves downwardly at the start of its revolution, the pivot connection 196 exerts pull on the link 194 to move the link 236 downwardly and rock the lever 232 so as to cause the ejector 222 to move upwardly in its guides 32 and push a slide held against the wall 14 by the slide gate springs 200 upwardly and clear of the aperture 16 in the wall 14. Simultaneously with the downward movement of the link 236, the rock lever 180 is moved about its pivot 178 to move the arm 182 in a clockwise direction and thus cause the injector 186 to advance in its guide grooves 42 across the table 38 and push a slide resting thereon into the chamber 34. In the meantime the link 220 will have been moved by the crank arm so that the stud 218 engages the end of the slot 216 in the extension 214 of the link 212 to exert push thereon and cause the bell crank 202 to rock against the effort of the spring 206 and move the slide gate springs 200 away from the wall 14 and into a position to receive the slide projected into the chamber 34 by the injector 186. Upon further movement of the crank arm 108, the link 220 will withdraw the stud 218 from contact with the end wall of the slot 216 and permit the film gate to close under the influence of the spring 206, and thus move the slide received by the slide gate into position before the aperture 16. Upon further movement of the cam wheel 154 the shutters 174 is moved by the cam 156 to open position so that light from the source of illumination will be projected through the slide and the picture thereon will be visible on a screen placed in front of the exhibitor. The various cycles of operation are continuously repeated so long as the prime mover 92 remains energized. In this way automatic exhibition of slides may be accomplished and the speed with which the slides are exhibited may be varied to suit the desires of the user.

While in the foregoing there has been shown and described the preferred form of this invention, it is to be understood that minor changes in the details of construction, combination and arrangement of parts may be resorted to without departing from the spirit and scope of the invention as claimed.

I claim:

1. In a slide projector of the type having a lamp house having an aperture extending therethrough, a source of illumination and a condensing lens system within said lamp house for projecting a beam of light through said aperture, a projector housing adjacent the lamp house, a focusing lens system carried by the projector housing in spaced relation to the lamp house and defining with said lamp house a slide receiving chamber, said focusing lens system aligning with the aperture and the condensing lens system, a magazine rising from the projector housing above the focusing lens system to receive a stack of slides, means for moving the bottommost slide from the slide stack and positioning it before the aperture comprising an injector mounted above the focusing lens system for movement horizontally beneath the stack of slides, a slide gate mounted within the slide receiving chamber to rock about a horizontal axis below the aperture, a system of interconnecting levers and links operably connected to the injector and to the slide gate for moving said injector and slide gate in proper sequence to project a slide from the slide stack onto the slide gate within the chamber and to move said slide gate with the slide thereon to a position before the aperture, a drive shaft, a prime mover for rotating said drive shaft, a crank arm mounted on the drive shaft for independent rotation with relation thereto, said crank arm being operatively connected to the system of levers and links for operating the injector and the slide gate, a cam disk mounted for rotation adjacent the drive shaft, means establishing driving connection between the drive shaft and the cam disk, a trip cam on the cam disk, and means on the drive shaft and contacting the cam disk for engaging the trip cam to establish driving connection between the drive shaft and the crank arm.

2. In a slide projector of the type having a lamp house having an aperture extending therethrough, a source of illumination and a condensing lens system within said lamp house for projecting a beam of light through said aperture, a projector housing adjacent the lamp house, a focusing lens system carried by the projector housing in spaced relation to the lamp house and defining with said lamp house a slide receiving chamber, said focusing lens system aligning with the aperture and the condensing lens system, a magazine rising from the projector housing above the focusing lens system to receive a stack of slides, means for interrupting the projection of light through the projector and while the light is so interrupted ejecting a previously exhibited slide from its position before the aperture and positioning a different slide before the aperture, said means compring, a drive shaft mounted to rotate below the projector housing, a cam disk mounted to rotate adjacent the drive shaft a trip cam on the side of the cam disk, an actuating cam on the periphery of the cam disk, means establishing driving connection between the drive shaft and the cam disk, a crank arm mounted on the drive shaft to rotate independently with relation thereto, normally disengaged clutch means carried by the drive shaft for establishing driving connection between the drive shaft and the crank arm, means bearing on the clutch means and extending into the path of movement of the trip cam for engaging said clutch means and causing the crank arm to rotate with the drive shaft, a slide ejector mounted in the slide receiving chamber for moving a slide away from its position before the aperture, a slide injector mounted above the focusing lens system for moving an unexhibited slide into the chamber, a system of links and levers connected to the injector and to the ejector and to the crank arm for moving said injector and ejector simultaneously a slide gate mounted in the chamber to rock about a horizontal axis therein, a system of links and levers connected to the crank arm and to the slide gate for moving the film gate in timed relation to the movements of the injector and the ejector, a shutter mounted in the lamp house for movement therein into and out of position between the source of illumination and the condensing lens system, and means connected to the shutter and engaging the periphery of the cam disk for moving the shutter to open position when engaged by the actuating cam on the cam disk.

3. In a slide projector of the type having a lamp house having an aperture extending therethrough, a source of illumination and a condensing lens system within said lamp house for projecting a beam of light through said aperture, a projector housing adjacent the lamp house, a focusing lens system carried by the projector housing in spaced relation to the lamp house and defining with said lamp house a slide receiving chamber, said focusing lens system aligning with the aperture and the condensing lens system, a magazine rising from the projector housing above the focusing lens system to receive a stack of slides, means for interrupting the projection of light through the projector and while the light is so interrupted ejecting a previously projected slide from its position before the aperture and positioning a different slide before the aperture, said means comprising a drive shaft mounted to rotate below the projector housing, a cam disk mounted to rotate adjacent the drive shaft, a trip cam on the side of the cam disk, an actuating cam on the periphery of the cam disk, means establishing driving connection between the drive shaft and the cam disk, a crank arm mounted on the drive shaft to rotate independently with relation thereto, normally disengaged clutch means carried by the drive shaft for establishing driving connection between the drive shaft and the crank arm, means bearing on the clutch means and extending into the path of movement of the trip cam for engaging said clutch means and causing the crank arm to rotate with the draft shaft, a slide ejector mounted in the chamber for moving a slide away from its position before the aperture, a slide injector mounted above the focusing lens system for moving an unexhibited slide into the chamber, a system of links and levers connected to the injector and to the ejector and to the crank arm for moving said injector and ejector simultaneously, a slide gate mounted in the slide receiving chamber to rock about a horizontal axis therein, a system of links and levers connected to the crank arm and to the slide gate for moving the slide gate in timed relation to the movements of the injector and the ejector, and means engaging the periphery of the cam disk for moving the light interrupting means to open position when engaged by the actuating cam on the cam disk, a prime mover and speed changing means establishing driving connection between the prime mover and the drive shaft.

4. In a slide projector of the type having a lamp house having an aperture extending therethrough, a source of illumination and a condensing lens system within said lamp house for projecting a beam of light through said aperture, a projector housing adjacent the lamp house, a focusing lens system carried by the projector housing in spaced relation to the lamp house and defining with said lamp house a slide receiving chamber, said focusing lens system aligning with the aperture and the condensing lens system, a magazine rising from the projector housing above the focusing lens system to receive a stack of slides, means for interrupting the projection of light through the projector and while the light is so interrupted ejecting a previously projected slide from its position before the aperture and positioning a different slide before the aperture, said means comprising, a drive shaft mounted to rotate below the projector housing, a cam disk mounted to rotate adjacent the drive shaft a trip cam on the side of the cam disk, an actuating cam on the periphery of the cam disk, means establishing driving connection between the drive shaft and the cam disk, a crank arm mounted on the drive shaft to rotate independently with relation thereto, normally disengaged clutch means carried by the drive shaft for establishing driving connection between the drive shaft and the crank arm, means bearing on the clutch means and extending into the path of movement of the trip cam for engaging said clutch means and causing the crank arm to rotate with the draft shaft, a slide ejector mounted in the chamber for moving a slide away from its position before the aperture, a slide injector mounted above the focusing lens system for moving an unexhibited slide into the slide receiving chamber, a system of links and levers connected to the injector and to the ejector and to the crank arm for moving said injector and ejector simultaneously, a film gate mounted in the chamber to rock about a horizontal axis therein, a system of links and levers connected to the crank arm and to the film gate for moving the film gate in timed relation to the movements of the injector and the ejector, a shutter mounted in the lamp house for movement therein into and out of position between the source of illumination and the condensing lens system, and means connected to the shutter and engaging the periphery of the cam disk for moving the shutter to open position when engaged by the actuating cam on the cam disk, a prime mover, speed changing means establishing driving connection between the prime mover and the drive shaft, and manually actuated means carried by the projector housing and connected to the speed changing means to selectively control the speed at which the drive shaft rotates.

RONALD L. BURLA.

References Cited in the file of this patent

UNITED STATES PATENTS

| Number | Name | Date |
|---|---|---|
| 647,530 | Schneider | Apr. 17, 1900 |
| 1,161,660 | Guerzoni et al. | Nov. 23, 1915 |
| 1,247,608 | Alguire | Nov. 27, 1917 |
| 1,298,417 | Stillwaggon | Mar. 25, 1919 |
| 1,869,965 | Horowitz | Aug. 2, 1932 |
| 2,503,239 | Antos | Apr. 11, 1950 |